United States Patent
Chintada et al.

(10) Patent No.: US 8,583,107 B2
(45) Date of Patent: Nov. 12, 2013

(54) SYSTEM AND METHOD FOR FIXED MOBILE CONVERGENCE USING A RESIDENTIAL GATEWAY APPARATUS

(75) Inventors: Suresh Kumar Chintada, Bangalore (IN); Rajashekaran E. Ethiraju, Bangalore (IN); Rupak K. Maiti, Calcutta (IN); Rajesh Pazhyannur, Lake Zurich, IL (US); Satyanarayana T, Bangalore (IN)

(73) Assignee: Motorola Mobility LLC, Libertyville, IL (US)

( * ) Notice: Subject to any disclaimer, the term of this patent is extended or adjusted under 35 U.S.C. 154(b) by 961 days.

(21) Appl. No.: 12/023,471

(22) Filed: Jan. 31, 2008

(65) Prior Publication Data

US 2009/0197594 A1    Aug. 6, 2009

(51) Int. Cl.
    *H04W 4/00*    (2009.01)
(52) U.S. Cl.
    USPC ............... 455/432.1; 455/41.2; 455/422.1; 455/432.2; 455/433; 455/435.1; 455/435.2; 455/436; 455/444; 455/455; 455/552.1; 455/553.1; 370/310.2; 370/328; 370/331; 370/338
(58) Field of Classification Search
    USPC ............ 455/41.2, 41.3, 422.1, 432.1, 433, 455/435.1, 0.2, 436, 444, 455, 552.1, 455/553.1; 370/310.2, 328, 331, 338
    See application file for complete search history.

(56) References Cited

U.S. PATENT DOCUMENTS

| | | | | |
|---|---|---|---|---|
| 5,367,558 | A * | 11/1994 | Gillig et al. | 455/426.1 |
| 5,533,099 | A * | 7/1996 | Byrne | 455/552.1 |
| 6,542,597 | B1 * | 4/2003 | Brakefield | 379/211.01 |
| 7,082,301 | B2 * | 7/2006 | Jagadeesan et al. | 455/436 |
| 7,089,005 | B2 * | 8/2006 | Reddy | 455/436 |
| 7,089,006 | B2 * | 8/2006 | Idnani et al. | 455/436 |
| 7,215,959 | B2 * | 5/2007 | Creamer et al. | 455/436 |
| 7,280,505 | B2 * | 10/2007 | Chaskar et al. | 370/331 |
| 7,382,791 | B2 * | 6/2008 | Thermond | 370/401 |
| 7,593,722 | B2 * | 9/2009 | Jagadeesan et al. | 455/418 |
| 2001/0046872 | A1 * | 11/2001 | Masuda | 455/502 |
| 2004/0246990 | A1 | 12/2004 | Krishnamurthi et al. | |
| 2004/0264410 | A1 | 12/2004 | Sagi et al. | |
| 2007/0070948 | A1 | 3/2007 | Kezys et al. | |

OTHER PUBLICATIONS

EPC Extended Search Report, Re: Application #09000927.5-2413 Jun. 18, 2009.

* cited by examiner

*Primary Examiner* — Steve D Agosta (57) ABSTRACT

A system and method for providing call mobility for a dual-mode phone between a cellular network and a home wireless network for a dual-mode phone having a cellular identity and a home identity, wherein the home identity is active when the dual-mode phone is in communication with the home wireless network. The system comprises a residential gateway to connect the home wireless network to a public network, and a VoIP service provider in communication with a mobile switching center on the cellular network and the public network. After placing or receiving a call, the dual-mode phone sends a signal to the residential gateway to initiate the movement of the call between the cellular network and the home wireless network while the call is ongoing.

21 Claims, 12 Drawing Sheets

*FIG. 13*

SYSTEM AND METHOD FOR FIXED MOBILE CONVERGENCE USING A RESIDENTIAL GATEWAY APPARATUS

FIELD OF THE INVENTION

The present invention relates generally to providing cellular call mobility using a residential gateway apparatus.

BACKGROUND

In residential home construction and remodeling it has recently become common to install wiring to provide broadband data communication access to the Internet. The broadband data communication may utilize cable, fiber optic, Digital Subscriber Line (DSL) wiring, and the like.

It has also become common for residential homes to include a local area network (LAN) that connects to the broadband data communication access. Traditionally, a LAN in a residential home connected each component with a physical wire; however, residential homes are increasingly using wireless communications to connect some of the LAN components and creating a wireless LAN (WLAN).

A residential gateway (RG) is typically known as a hardware device that connects a LAN or WLAN with a wide area network (WAN) such as the Internet. The residential gateway provides port translation thereby allowing all of the computers in a small network to share one Internet Protocol (IP) address and Internet connection. The residential gateway may be located between the modem and the LAN, or a DSL or cable modem may be integrated into the residential gateway. A residential gateway often combines the functions of an IP router, multi-port Ethernet switch and WLAN access point. Residential gateways that include routing capabilities are converged devices and sometimes referred to as home routers or broadband routers, where "broadband" refers not to the router function, but the Internet access function.

Voice over Internet Protocol (VoIP) which is generally referred to the routing of voice conversations over the Internet or through any other IP-based network. The popularity of VoIP is increasing as more consumers are adding an extra telephone line to a home or office.

A dual-mode phone is typically referred to as a phone which uses more than one technique for sending and receiving voice and data. There are currently three types of dual mode phones, mobile phones containing two types of cellular radios for voice and data, mobile phones containing both cellular and non-cellular radios used for voice and data communication, and wired phones with VoIP and plain old telephone service (POTS) technology. Thus, dual-mode phones are breaking away from being merely prototypes to being used both in wireless VoIP networks, as well as, cellular networks.

There is currently no solution that will enable fixed mobile convergence between wireless VoIP networks and cellular networks without upgrading the network infrastructure of either the VoIP provider or cellular networks. Thus, there is a need for a mobility solution that will reside in the residential gateway inside the customer's premises, and that will enable dual-mode phones to move existing calls seamlessly between a home VoIP network and a cellular network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to providing cellular call mobility using a residential gateway apparatus. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of providing cellular call mobility using a residential gateway apparatus described herein. The non-processor circuits may include, but are not limited to, a radio receiver, a radio transmitter, signal drivers, clock circuits, power source circuits, and user input devices. As such, these functions may be interpreted as steps of a method to providing cellular call mobility using a residential gateway apparatus. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
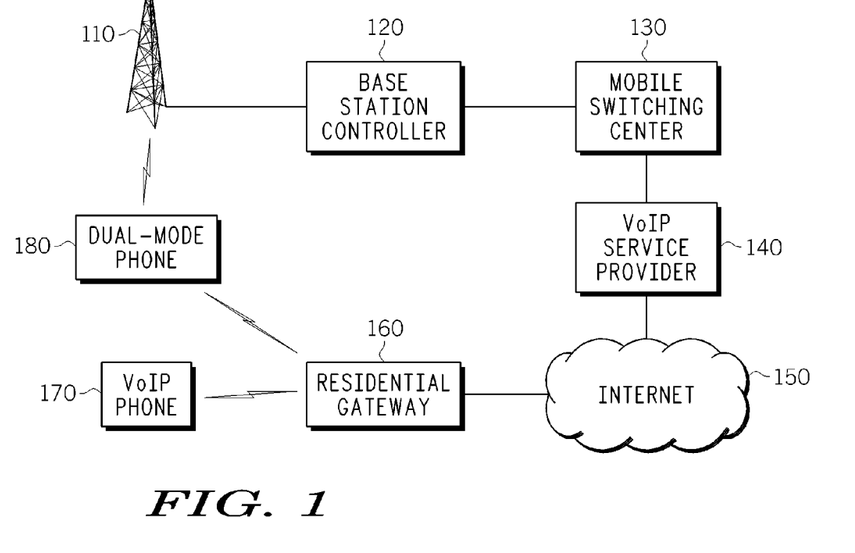
FIG. 1 is a network diagram that illustrates the components comprising an exemplary embodiment of a system for providing cellular call mobility using a residential gateway apparatus in accordance with some embodiments of the invention.

FIG. 1 is a network diagram that illustrates the components comprising an exemplary embodiment of a system for providing cellular call mobility using a residential gateway apparatus in accordance with some embodiments of the invention. The system for providing cellular call mobility using a residential gateway apparatus comprises a cellular network and a home wireless network. The cellular network comprises a cellular tower 110, base station controller 120, and mobile switching center 130. The home wireless network comprises a VoIP service provider 140, residential gateway 160, VoIP phone 170, dual-mode phone 180, and a network such as Internet 150.

The VoIP service provider 140 provides its service by deploying VoIP infrastructure with entities such as Session Initiation Protocol (SIP) proxies, SIP registrars, and media gateways in its service network. Vonage is an example of the VoIP service provider 140.

The VoIP service provider 140 communicates with a cellular site 110 via a base station controller 120 and a mobile switching center 130 to provide voice service to users with cellular phones. The base station controller 120 controls the equipments for the transmitting and receiving radio signals. The mobile switching center 130 provides the circuit-switched calling, mobility management, and GSM services to the mobile phones roaming within the area that it serves. The VoIP service provider 140 also communicates with a residential gateway 160 via a network such as the Internet 150. The VoIP service provider 140 provisions publicly routable telephone numbers that can be provisioned on the residential gateway 160.

The residential gateway 160 comprises broadband LAN ports to communicate via a broadband modem (not shown), such as a DSL or cable modem, with a network such as the Internet 150. The residential gateway 160 further comprises a Wi-Fi access point (not shown) to facilitate communication with devices, such as a VoIP phone 170, dual-mode phone 180, desktop computer, laptop computer, printer, or the like, which are connected on the in-home IP network. The Motorola VT2450 is an example of the residential gateway 160.

The residential gateway 160 performs session initiation protocol (SIP) functions to create, modify, and terminate sessions with one or more participants. Specifically, the residential gateway 160 functions as an SIP proxy server and registrar. As a proxy server, the residential gateway 160 routes requests to the user's current location, authenticates and authorizes users for services, implements provider call-routing policies, and provides features to users. As a registrar, the residential gateway 160 registers new devices and allows users to upload their current locations for use by proxy servers. The residential gateway 160 implements the Internet Engineering Task Force (IETF) SIP Working Group, Request for Comments (RFC) 3261, titled "SIP: Session Initiation Protocol".

The dual-mode phone 180 comprises two radios, a Wi-Fi radio and a cellular radio (either GSM or CDMA). The dual-mode phone 180 includes a uniform user interface to allow a user to choose which radio to use while making an outgoing call, and may maintain separate radio and signaling stacks for the Wi-Fi and cellular radios. During a handover process, both the Wi-Fi and cellular radio may be activated simultaneously for a short period of time. In addition, the Wi-Fi radio further comprises an SIP-based VoIP capability.

When the dual-mode phone 180, also known as a dual-mode handset (DMH), enters the home network the residential gateway 160 registers the dual-mode phone 180 and associates it with a phone extension from the residential gateway 160 (DMH_home). When the dual-mode phone 180 exits the home network the residential gateway 160 de-registers the dual-mode phone 180 and associates it with its cellular phone number (DMH_cellular). The system depicted in FIG. 1 supports the mobility or movement of the dual-mode phone 180 from the wireless network to the cellular network during a call. The dual-mode phone 180 user initiates the call movement from the DMH_home extension to the DMH_cellular identity by dialing a special key sequence on the dual-mode phone 180 (e.g., "*89") when he intends to move the call from DMH_home to DMH_cellular. The residential gateway 160 interprets the key sequence and establishes a new call let to the DMH_cellular identity and bridges the call. The residential gateway 160 anchors the call and thereby does not require a change in the VoIP service provider 140 and SIP infrastructure.

In one embodiment, the call movement is supported between the wireless network and the cellular network by sending a "REFER" procedure to the caller or VoIP service provider 140 who then makes a new call to the changed callee endpoint.

In another embodiment, the call movement is supported between the wireless network and the cellular network using a "re-INVITE" procedure and bridging the call at the residential gateway 160. In one scenario for handling the mobility, a user needs to go out of the home network while on a call initiated at DMH_home, but still needs the call to continue. In this scenario, the user pushes the call from DMH_home to the DMH_cellular identity by dialing a pre-configured dual-tone multi-frequency (DTMF) signal digit sequence on the dual-mode phone 180 (e.g., "*89"). In the reverse mobility handling scenario, a user need to enter the home network while on a call initiated at the DMH_cellular identity, but still needs the call to continue. In this reverse scenario, the user pushes the call from DMH_cellular to the DMH_home identity by dialing a pre-configured DTMF signal digit sequence on the dual-mode phone 180 (e.g., "*89"). The DTMF signal digit sequence in the scenario and the reverse scenario need not, but may be the same.

In yet another embodiment, the residential gateway 160 bridges the incoming call to the DMH_home identity if the dual-mode phone 180 is in the home network, or to the DMH_cellular identity if the dual-mode phone 180 is outside the home network. If the dual-mode phone 180 receives an incoming call when the dual-mode phone 180 is not in the home network, the residential gateway 160 initiates another call to the DMH_cellular identity and bridges the call. If the dual-mode phone 180 is in the home network, the residential gateway 160 connects the call to the DMH_home identity.

When a dual-mode phone 180 moves between the home network and the cellular network, the "hand-out" mobility scenarios describe moving from the home network to the cellular network and the "hand-in" mobility scenarios describe moving from the cellular network to the home network. The "hand-out" scenarios comprise DMH_home originating calls to a cellular identity and moving out of the home network, DMH_home terminating incoming calls from a cellular identity, and DMH_home terminating incoming calls from another home extension. The "hand-in" scenarios comprise DMH_cellular originating calls to a home extension and moving into the home network, DMH_cellular terminating calls from a home extension and moving into the home network, and DMH_home terminating calls from another cellular identity and moving into the home network during the call.

Figure 2:
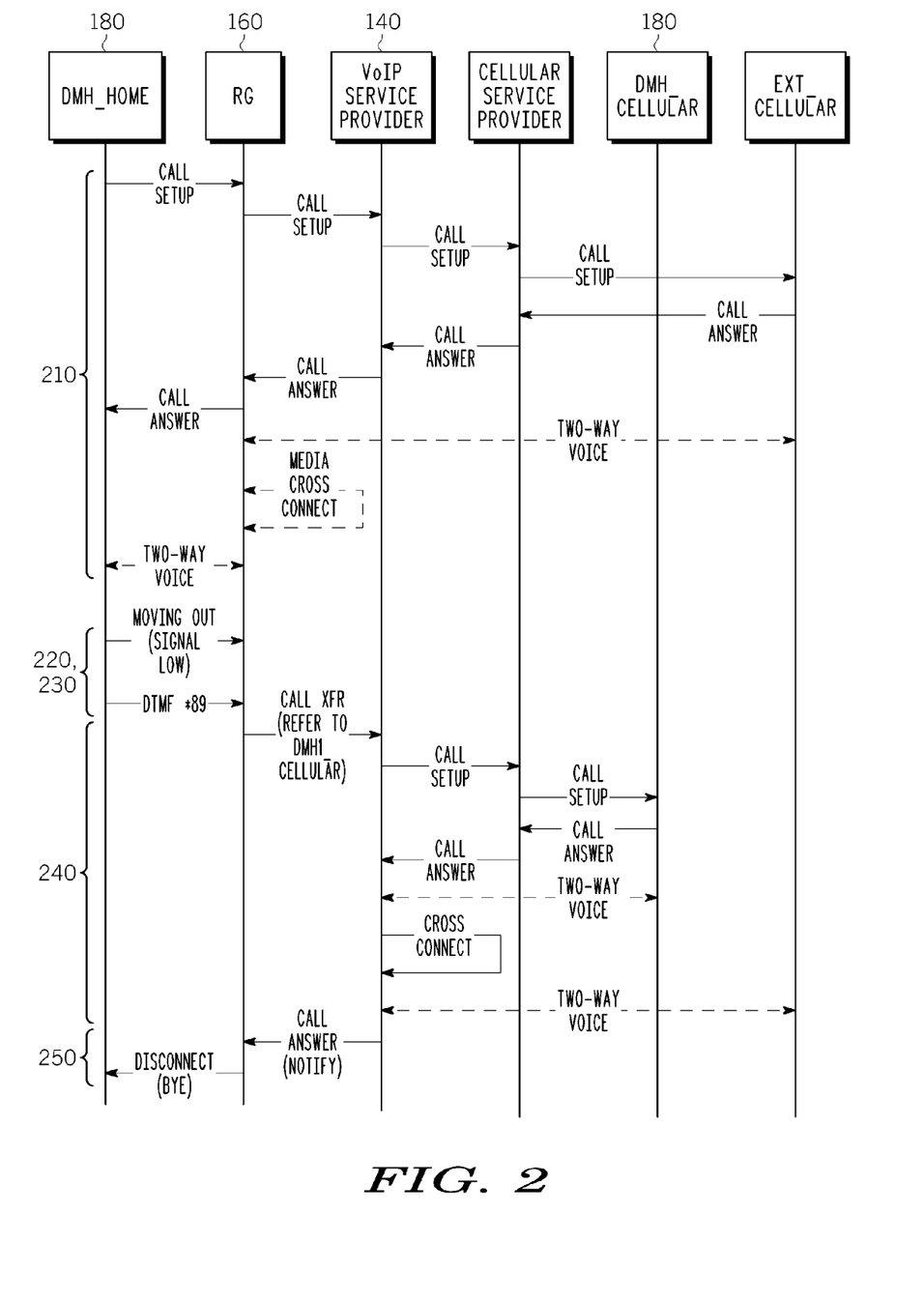
FIGS. 2 and 3 are exemplary flow diagrams that illustrate the method for the dual-mode phone to move out of the home network during a call with an external end point when the VoIP service provider controls the SIP media in accordance with some embodiments of the invention.
Figure 3:
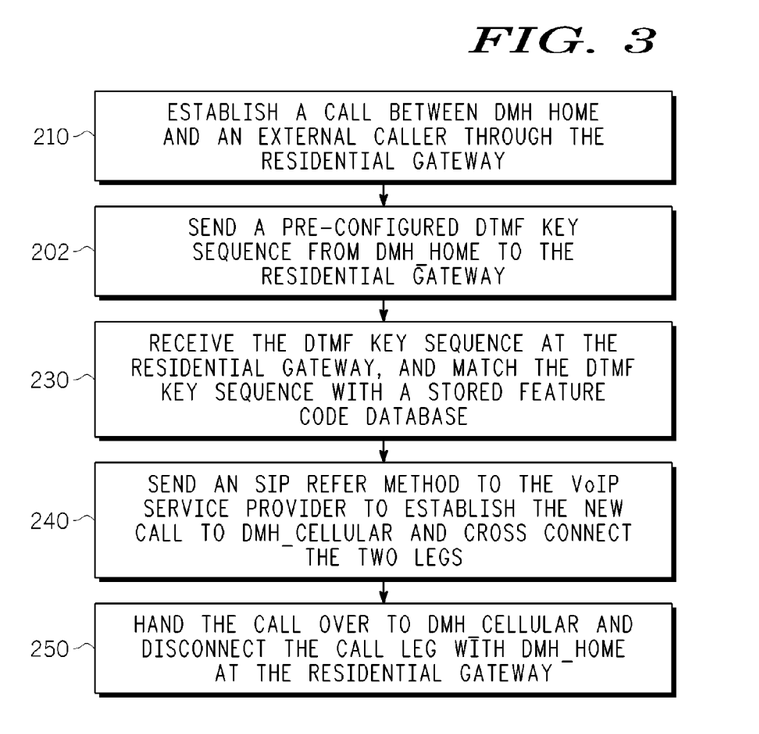

FIGS. 2 and 3 are exemplary flow diagrams that illustrate the method for the dual-mode phone 180 to move out of the home network during a call with an external end point when the VoIP service provider 140 controls the SIP media in accordance with some embodiments of the invention. FIG. 2 illustrates the method described in FIG. 3 as a communication message flow diagram. The operations shown in FIG. 2 that are performed during the corresponding steps in FIG. 3 are identified collectively by the corresponding step number as indicated. The process shown in FIG. 3 begins by establishing a call between DMH_home and an external caller through the residential gateway 160 (step 210). The hand-out process begins when the dual-mode phone 180 sends a pre-configured DTMF key sequence (e.g., "*89") from DMH_home to the residential gateway 160 (step 220). The residential gateway 160 receives the DTMF key sequence, and matches it with a stored feature code database (step 230). To initiate the handover of the call to the DMH_cellular identity, the residential gateway 160 sends an SIP REFER method to the VoIP service provider 140, which establishes the new call to the DMH_cellular identity and cross connects the two legs (step 240). The residential gateway 160 hands the call over to the DMH_cellular 180 and disconnects the call leg with the DMH_home identity at the residential gateway 160 (step 250).

Figure 4:
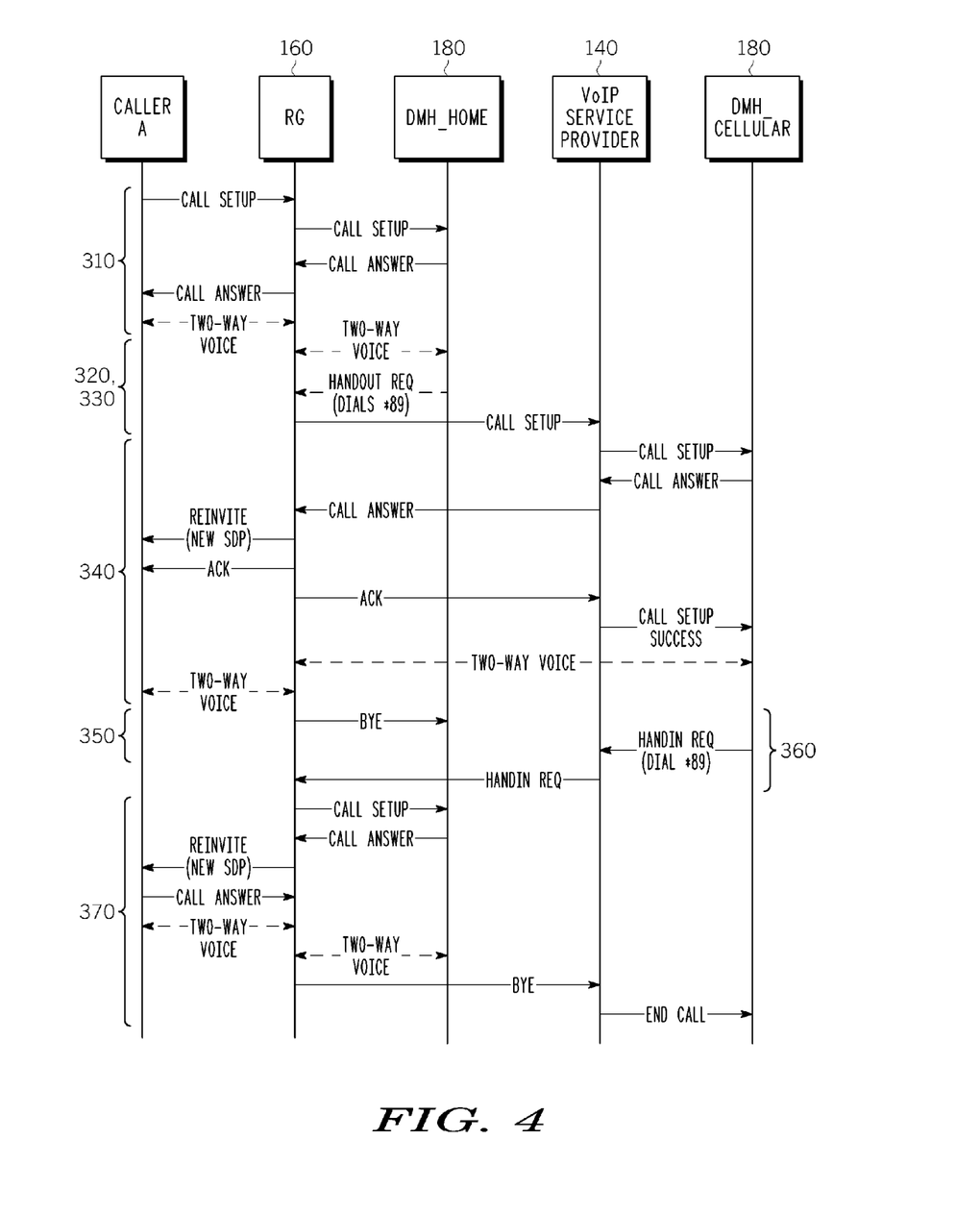
FIGS. 4 and 5 are exemplary flow diagrams that illustrate the method for the dual-mode phone to move out of the home network and back into the home network during a call with an external end point when the residential gateway controls the SIP media in accordance with some embodiments of the invention.
Figure 5:
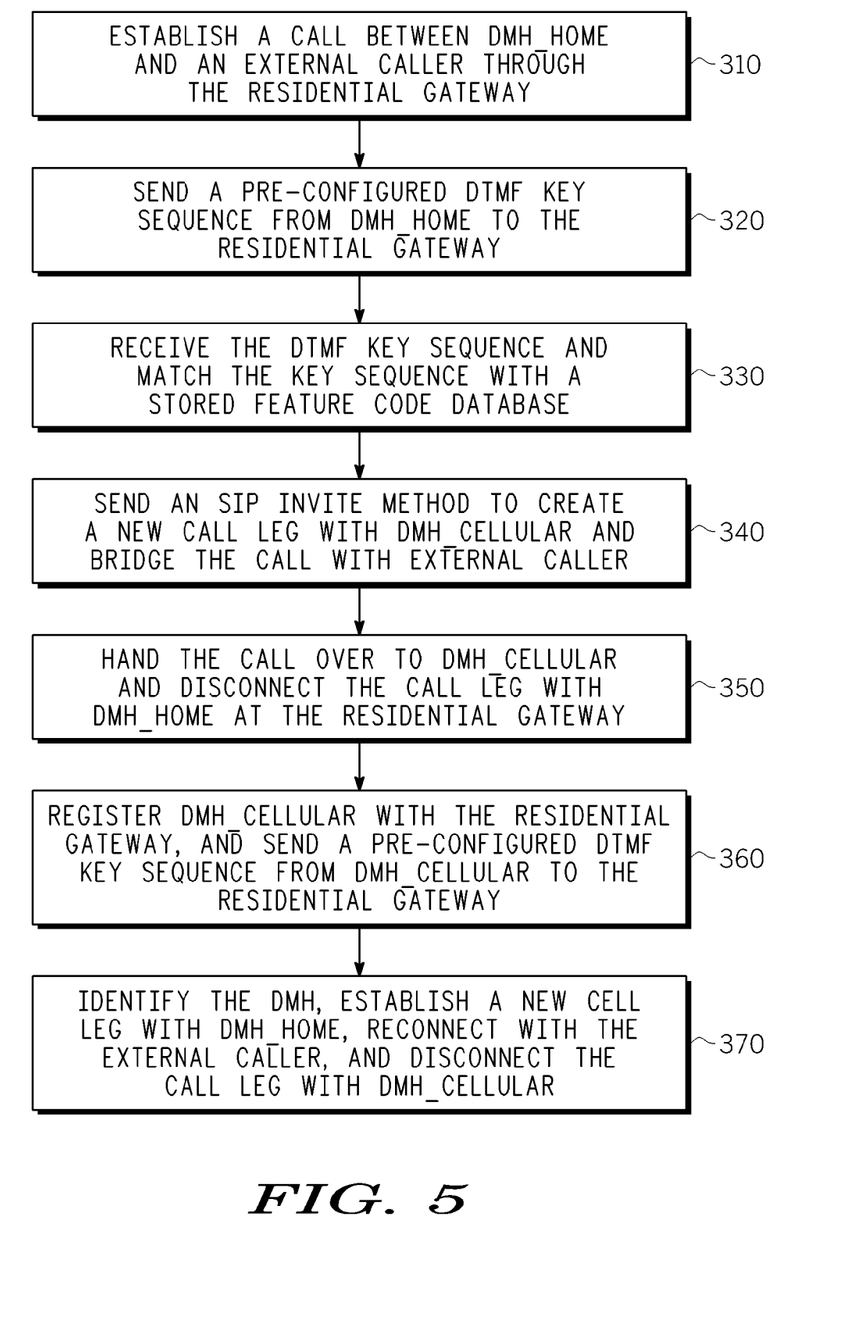

FIGS. 4 and 5 are exemplary flow diagrams that illustrate the method for the dual-mode phone 180 to move out of the home network and back into the home network during a call with an external end point when the residential gateway 160 controls the SIP media in accordance with some embodiments of the invention. FIG. 4 illustrates the method described in FIG. 5 as a communication message flow diagram. The operations shown in FIG. 4 that are performed during the corresponding steps in FIG. 5 are identified collectively by the corresponding step number as indicated. The process shown in FIG. 5 begins by establishing a call between DMH_home 180 and an external caller through the residential gateway 160 (step 310). It should be noted that the DMH-Cellular and DMH_home are logical entities of the Dual Mode Handset 180. The hand-out process begins when the dual-mode phone 180 sends a pre-configured DTMF key sequence (e.g., "*89") from DMH_home 180 to the residential gateway 160 (step 320). The residential gateway 160 receives the DTMF key sequence, and matches it with a stored feature code database (step 330). To initiates the handover of the call to the DMH_cellular identity, the residential gateway 160 sends an SIP INVITE method to create a new call leg with the DMH_cellular caller and bridges the call with the external caller (step 340). The residential gateway 160 hands the call over to the DMH_cellular and disconnects the call leg with the DMH_home identity at the residential gateway 160 (step 350). The hand-in process begins when the dual-mode phone 180 moves into the home network, registers with the residential gateway 160, and sends a pre-configured DTMF key sequence (e.g., "*89") from DMH_cellular to the residential gateway 160 (step 360). The residential gateway 160 identifies the dual-mode phone 180, establishes a new call leg with the DMH_home identity, reconnects with the external caller, and disconnects the call leg with DMH_cellular (step 370).

Figure 6:
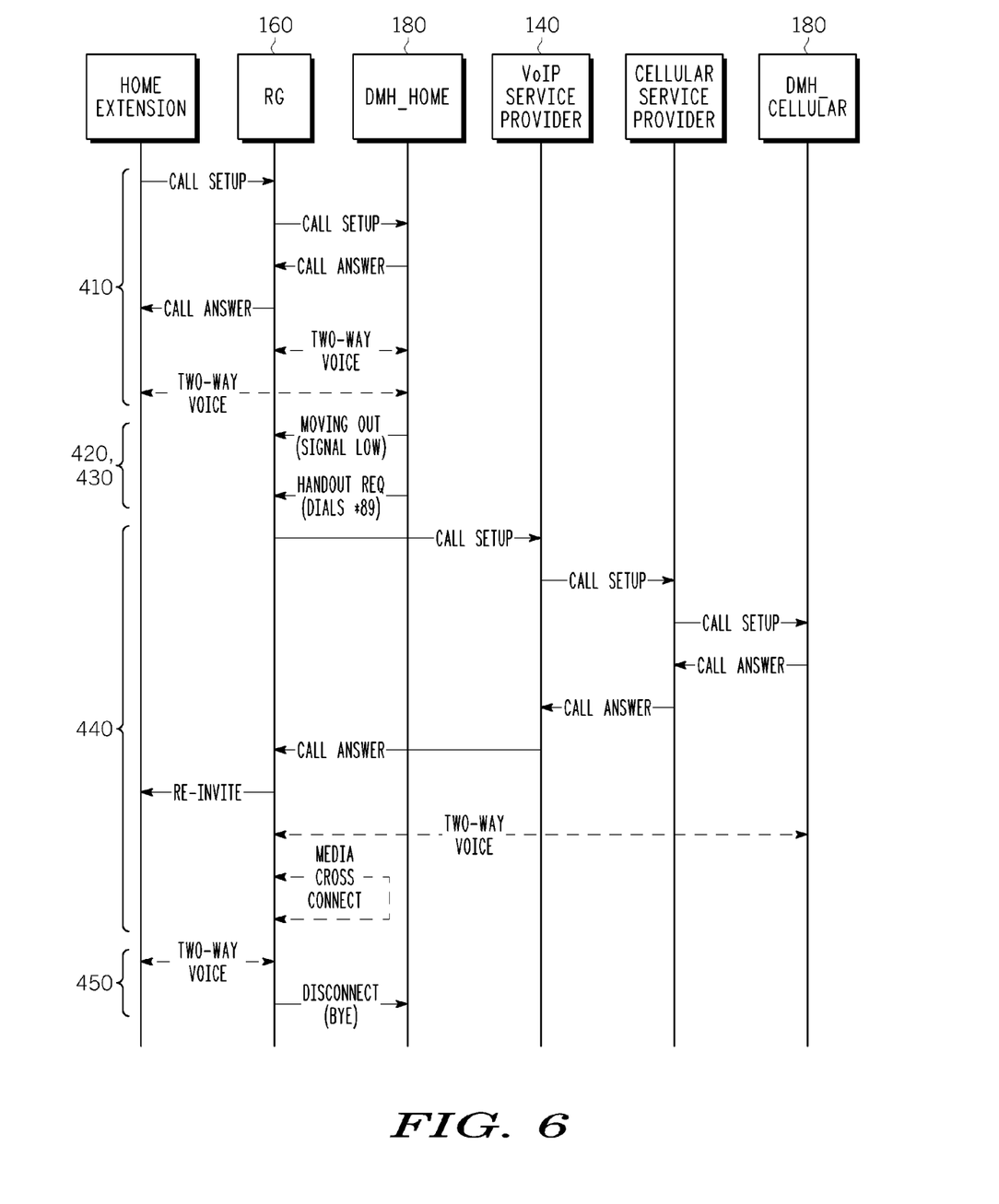
FIGS. 6 and 7 are exemplary flow diagrams that illustrate the method for the dual-mode phone to move out of the home network during a call with another extension on the home network when the residential gateway controls the SIP media in accordance with some embodiments of the invention.
Figure 7:
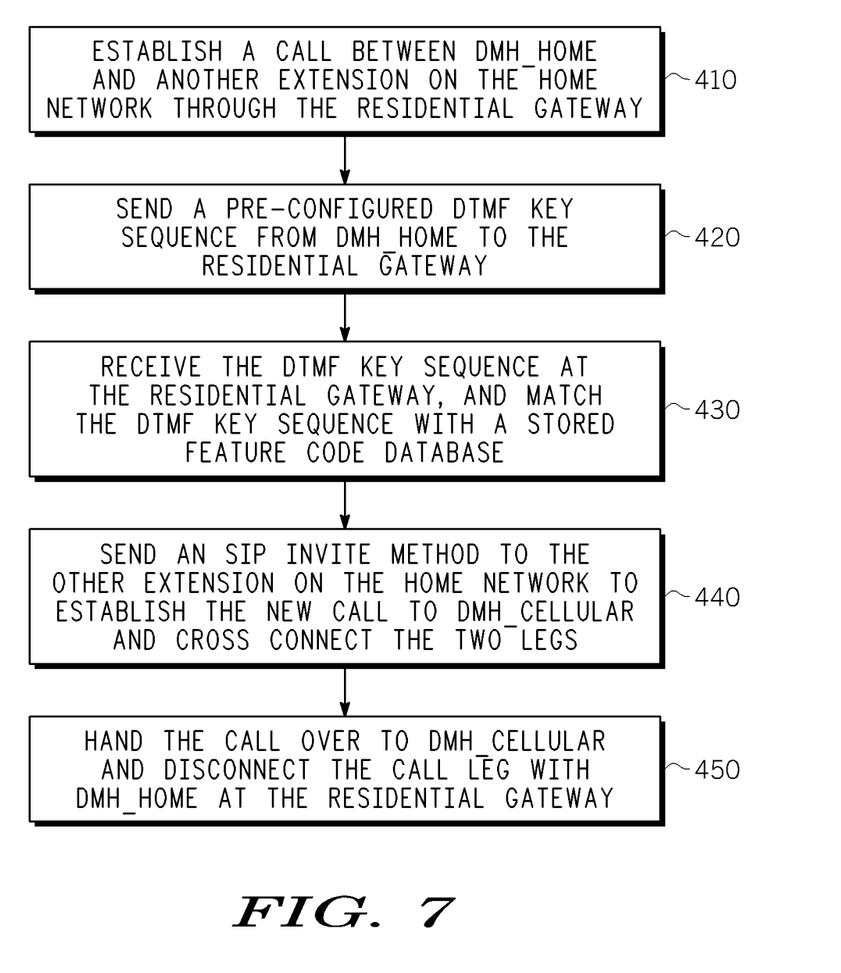

FIGS. 6 and 7 are exemplary flow diagrams that illustrate the method for the dual-mode phone 180 to move out of the home network during a call with another extension on the home network when the residential gateway 160 controls the SIP media in accordance with some embodiments of the invention. FIG. 6 illustrates the method described in FIG. 7 as a communication message flow diagram. The operations shown in FIG. 6 that are performed during the corresponding steps in FIG. 7 are identified collectively by the corresponding step number as indicated. The process shown in FIG. 6 begins by establishing a call between DMH_home and another extension on the home network through the residential gateway 160 (step 410). The hand-out process begins when the dual-mode phone 180 sends a pre-configured DTMF key sequence (e.g., "*89") from DMH_home to the residential gateway 160 (step 420). The residential gateway 160 receives the DTMF key sequence, and matches it with a stored feature code database (step 430). To initiate the handover of the call to the DMH_cellular identity, the residential gateway 160 sends an SIP INVITE method to the other extension on the home network, which establishes the new call to the DMH_cellular and cross connects the two legs (step 440). The residential gateway 160 hands the call over to the DMH_cellular and disconnects the call leg with the DMH_home identity at the residential gateway 160 (step 450).

Figure 8:
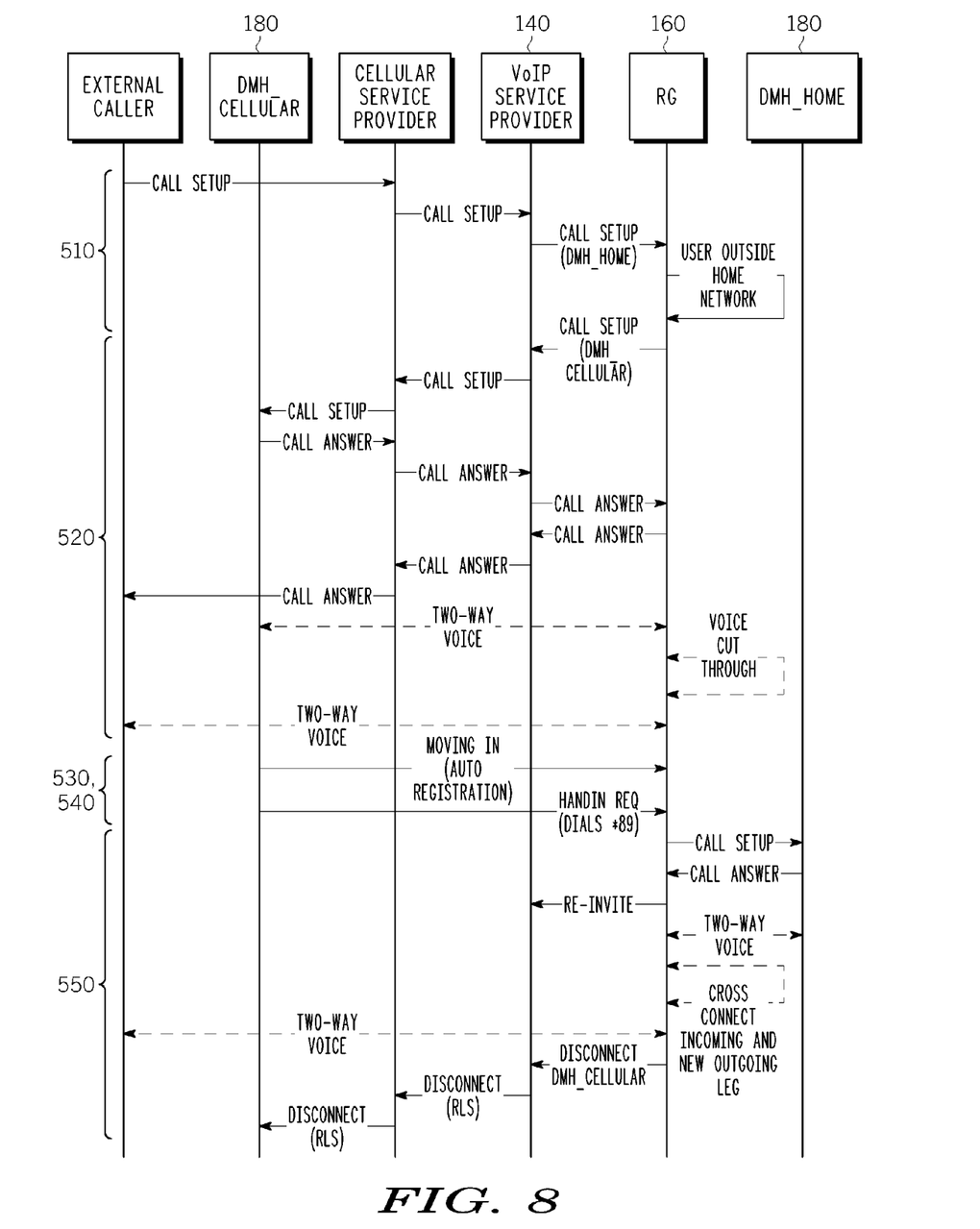
FIGS. 8 and 9 are exemplary flow diagrams that illustrate the method for the dual-mode phone to move into the home network during an incoming call anchored by the residential gateway in accordance with some embodiments of the invention.
Figure 9:
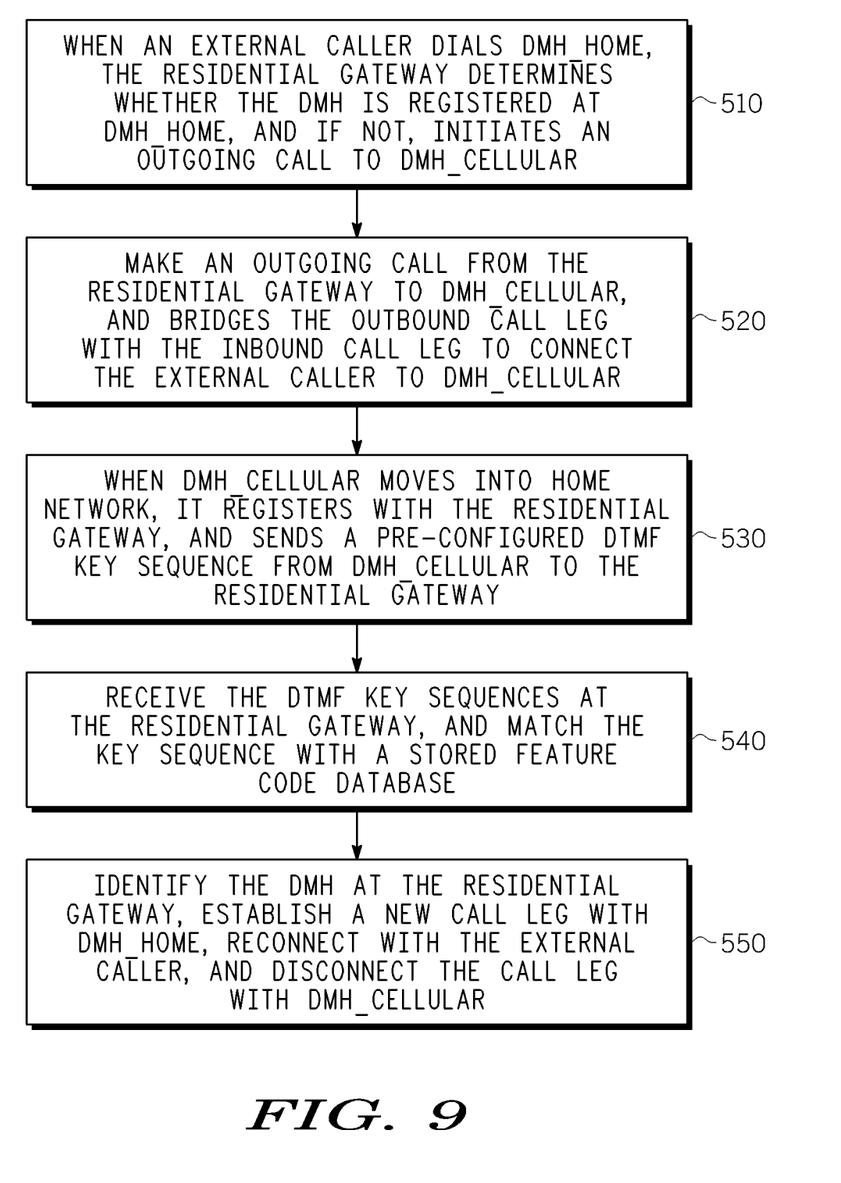

FIGS. 8 and 9 are exemplary flow diagrams that illustrate the method for the dual-mode phone 180 to move into the home network during an incoming call anchored by the residential gateway 160 in accordance with some embodiments of the invention. FIG. 8 illustrates the method described in FIG. 9 as a communication message flow diagram. The operations shown in FIG. 8 that are performed during the corresponding steps in FIG. 9 are identified collectively by the corresponding step number as indicated. As shown in FIG. 8, when an external caller dials the DMH_home identity of the dual-mode phone 180, the residential gateway 160 uses a location database to determine that the dual-mode phone 180 is not registered at DMH_home, but at the DMH_cellular identity, and initiates an outgoing call to the DMH_cellular identity (step 510). The residential gateway 160 makes an outgoing call the DMH_cellular identity and bridges the outbound call leg with the inbound call leg to connect the external caller to the DMH_cellular identity (step 520). The hand-in process begins when the dual-mode phone 180 moves into the home network, registers with the residential gateway 160, and sends a pre-configured DTMF key sequence (e.g., "*89") from DMH_cellular to the residential gateway 160 (step 530). The residential gateway 160 receives the DTMF key sequence, and matches it with a stored feature code database (step 540). The residential gateway 160 identifies the dual-mode phone 180, establishes a new call leg with the DMH_home identity, reconnects with the external caller, and disconnects the call leg with DMH_cellular (step 550).

Figure 10:
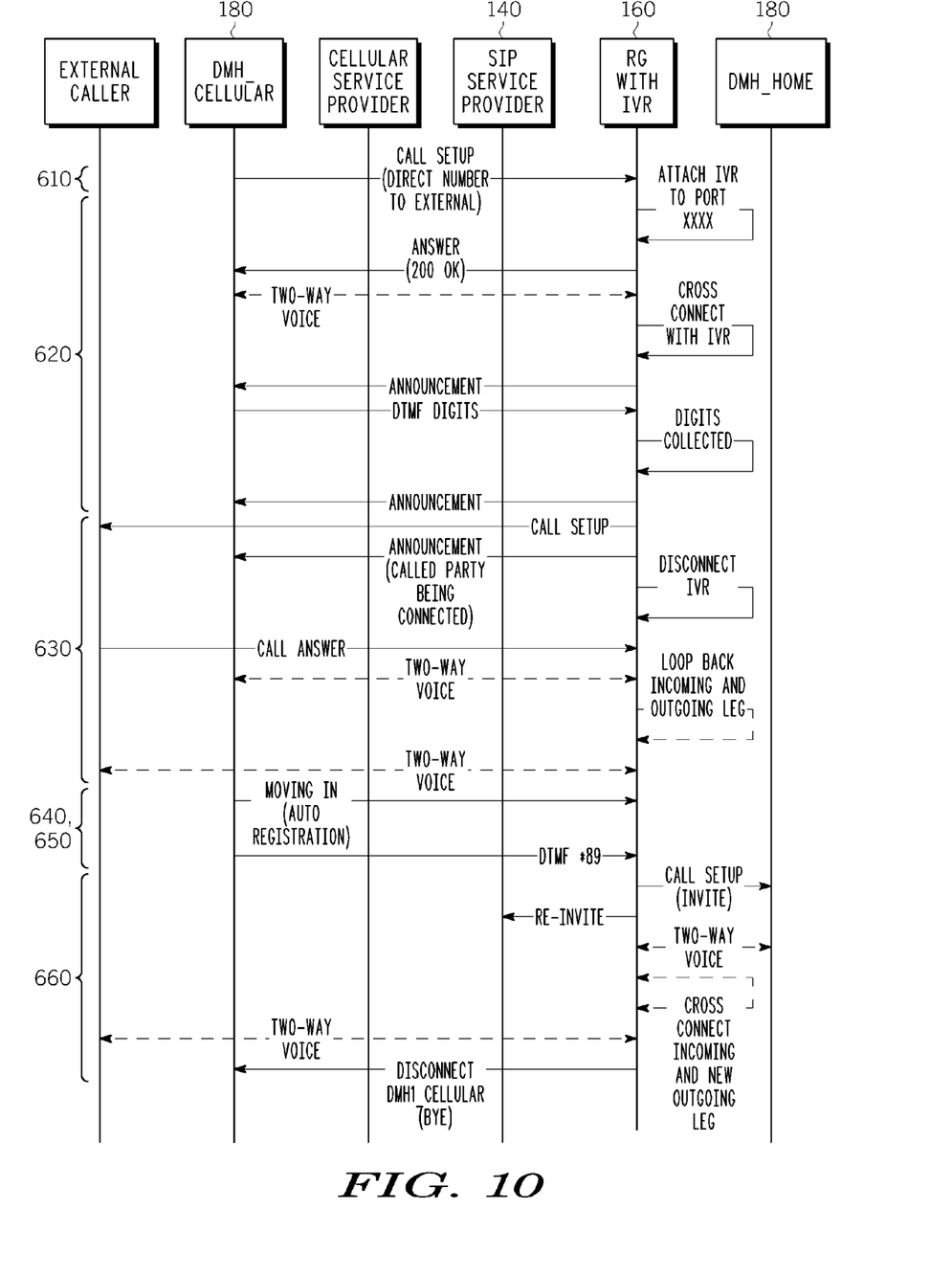
FIGS. 10 and 11 are exemplary flow diagrams that illustrate the method for the dual-mode phone to move into the home network during an outgoing call anchored by the residential gateway with interactive voice recognition (IVR) in accordance with some embodiments of the invention.
Figure 11:
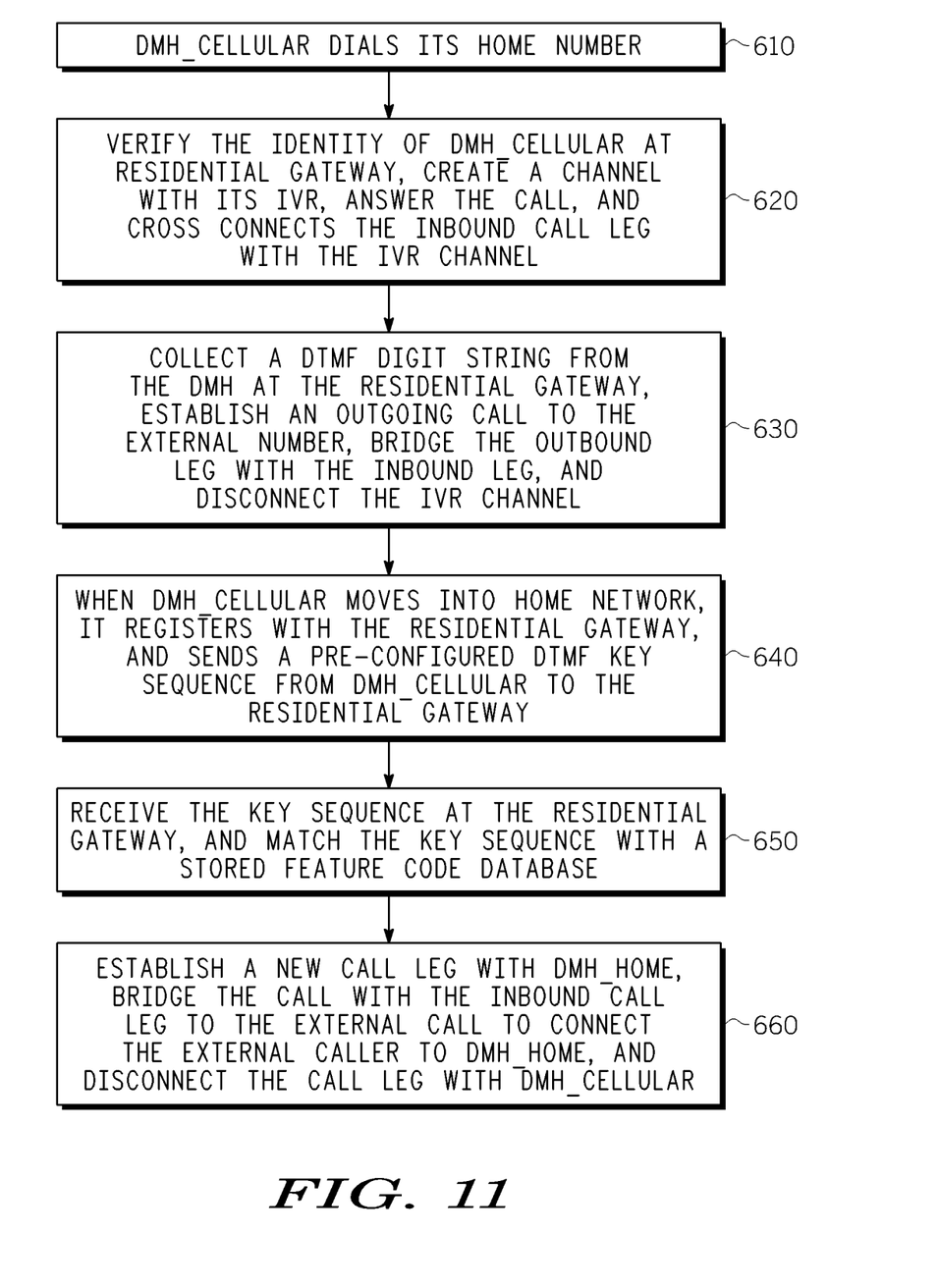

FIGS. 10 and 11 are exemplary flow diagrams that illustrate the method for the dual-mode phone 180 to move into the home network during an outgoing call anchored by the residential gateway 160 with interactive voice recognition (IVR) in accordance with some embodiments of the invention. FIG. 10 illustrates the method described in FIG. 11 as a communication message flow diagram. The operations shown in FIG. 10 that are performed during the corresponding steps in FIG. 11 are identified collectively by the corresponding step number as indicated. The process shown in FIG. 10 begins with the dual-mode phone 180 using its DMH_cellular identity to dial its home number (step 610). The residential gateway 160 verifies the identity of the caller to be a user of the home network, creates a channel with its IVR, answers the call, and cross connects the inbound call leg with the IVR channel (step 620). The residential gateway 160 collects a DTMF digit string from the dual-mode phone 180, establishes an outgoing call to the external number, bridges the outbound leg with the inbound leg, and disconnects the IVR channel (step 630). The hand-in process begins when the dual-mode phone 180 moves into the home network, registers with the residential gateway 160, and sends a pre-configured DTMF key sequence (e.g., "*89") from DMH_cellular to the residential gateway 160 (step 640). The residential gateway 160 receives the DTMF key sequence, and matches it with a stored feature code database (step 650). The residential gateway 160 establishes a new call leg with the DMH_home identity, bridges the call with the inbound call leg to the external call to connect the external caller to the DMH_home identity, and disconnects the call leg with DMH_cellular (step 660).

Figure 12:
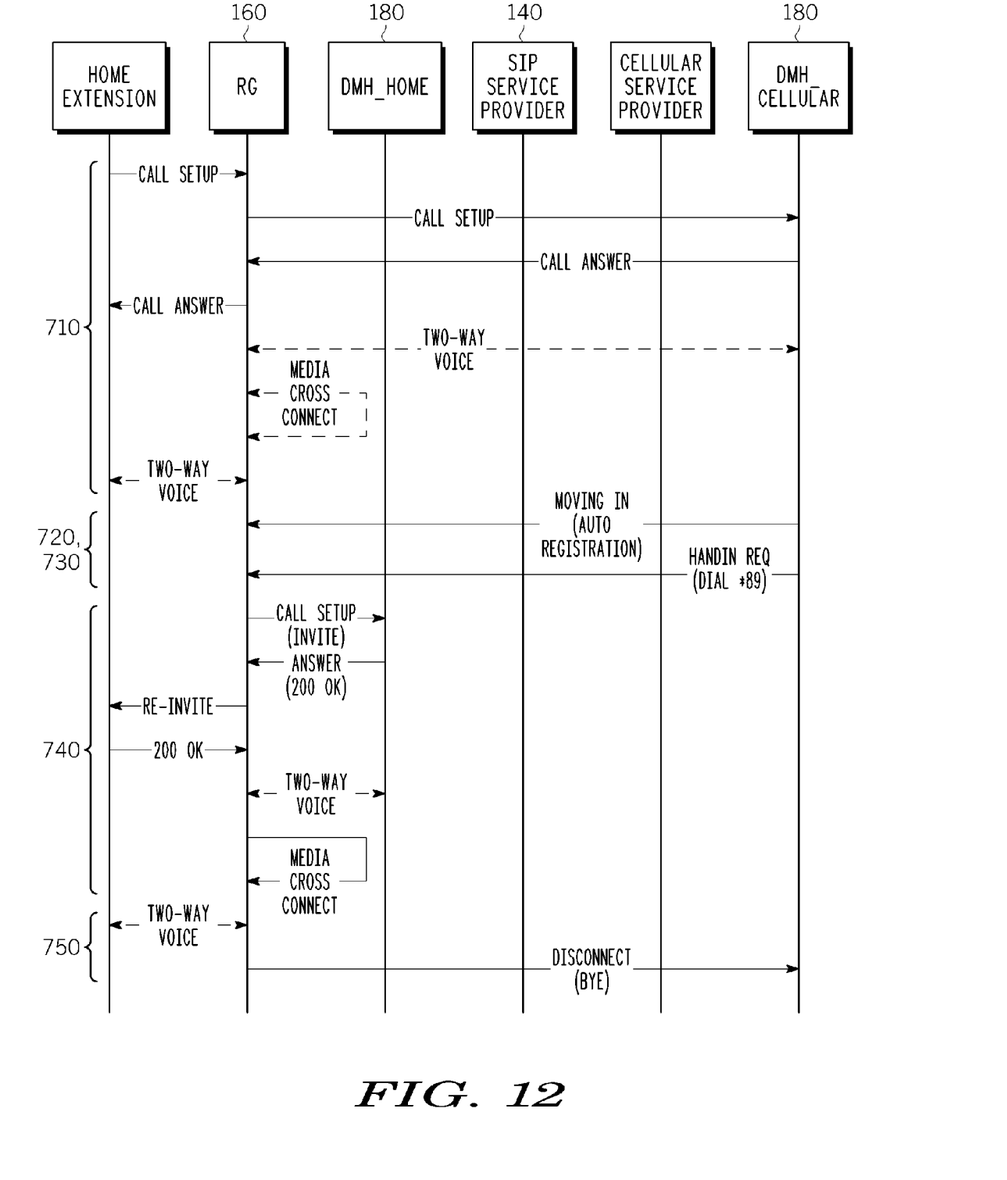
FIGS. 12 and 13 are exemplary flow diagrams that illustrate the method for the dual-mode phone to move into the home network during a call with another extension on the home network in accordance with some embodiments of the invention.
Figure 13:
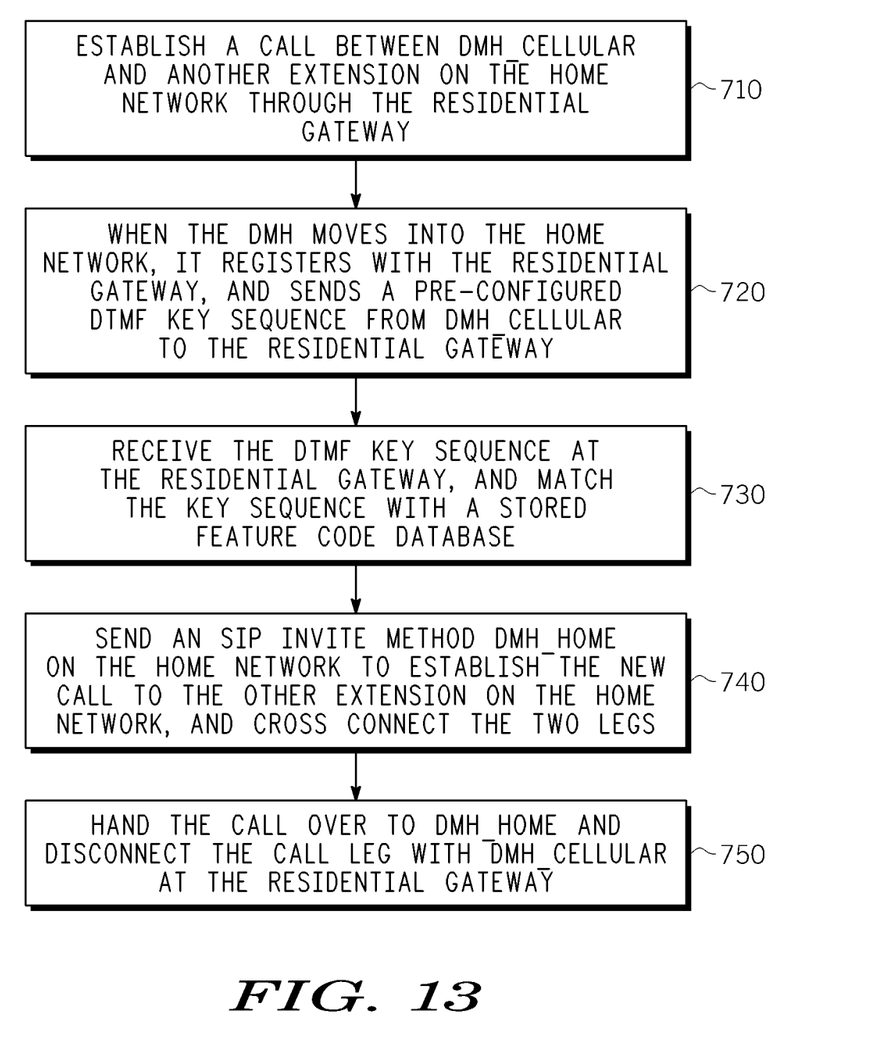

FIGS. 12 and 13 are exemplary flow diagrams that illustrate the method for the dual-mode phone 180 to move into the home network during a call with another extension on the home network in accordance with some embodiments of the invention. FIG. 12 illustrates the method described in FIG. 13 as a communication message flow diagram. The operations shown in FIG. 12 that are performed during the corresponding steps in FIG. 13 are identified collectively by the corresponding step number as indicated. The process shown in FIG. 13 begins by establishing a call between DMH_cellular and another extension on the home network through the residential gateway 160 (step 710). The hand-in process begins when the dual-mode phone 180 moves into the home network, registers with the residential gateway 160, and sends a pre-configured DTMF key sequence (e.g., "*89") from DMH_cellular to the residential gateway 160 (step 720). The residential gateway 160 receives the DTMF key sequence, and matches it with a stored feature code database (step 730). To initiate the handover of the call to the DMH_home identity, the residential gateway 160 sends an SIP INVITE method to the DMH_home identity on the home network, which establishes the new call to the other extension on the home network, and cross connects the two legs (step 740). The residential gateway 160 hands the call over to the DMH_home and disconnects the call leg with the DMH_cellular identity at the residential gateway 160 (step 750).

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A system for providing call mobility between a cellular network and a home wireless network for a dual-mode phone having a cellular identity and a home identity, wherein the home identity is active when the dual-mode phone is in communication with the home wireless network, the system comprising:

a residential gateway to connect the home wireless network to a public network;

the residential gateway configured to communicate, via the public network, with a VoIP service provider in communication with a mobile switching center on the cellular network and the public network;

the residential gateway further configured to receive a signal from the dual-mode phone to the residential gateway for initiating the movement of a call between the cellular network and the home wireless network while the call is ongoing, wherein the signal is a DTMF key sequence received by the residential gateway from the dual-mode phone on a voice channel previously established between the dual-mode phone and the residential gateway;

the residential gateway being further configured to interpret the signal and bridge the call;

and wherein all calls to the dual-mode phone are anchored in the residential gateway with voice traffic being routed through the residential gateway;

wherein the proxy server is an SIP proxy server and the registrar server is an SIP registrar server, wherein the residential gateway comprises a broadband communication port to facilitate communication with the public network, a wireless access point to facilitate communication with wireless devices on the home wireless network, a proxy server, and a registrar server, and the residential gateway is provisioned with an identity mapping table containing the cellular identity and the home identity of the dual-mode phone and provides a mapping from the home identity to the cellular identity and vice-versa.

2. The system of claim 1, wherein the dual-mode phone comprises a cellular radio to communicate with the cellular network, and a wireless local area network (LAN) radio to communicate with the home wireless network which includes a LAN network.

3. The system of claim 1, wherein the VoIP service provider manages cellular telephone traffic for the cellular network, and provides VoIP service to the home wireless network via the public network and the residential gateway.

4. The system of claim 1, wherein all calls to the dual-mode phone are anchored in the residential gateway with voice traffic being routed through the residential gateway.

5. The system of claim 1, wherein the signal is a DTMF key sequence that a user inputs into a keypad on the dual-mode phone and is transmitted along with the voice channel established between the dual-mode phone and the residential gateway.

6. The system of claim 1, wherein to initiate the movement of the ongoing call, the residential gateway establishes a new call, bridges the ongoing call and the new call, and disconnects the ongoing call.

7. A method for providing call mobility between a cellular network and a home wireless network for a dual-mode phone having a cellular identity and a home identity, wherein the home identity is active when the dual-mode phone is in communication with the home wireless network, the method comprising:
   placing an active call with the dual-mode phone on either one of the home wireless network and the cellular network; and
   sending a signal from the dual-mode phone to the residential gateway, while the call is ongoing, for initiating the movement of the call between the cellular network and the home wireless network;
   wherein the signal is a DTMF key sequence, transmitted to the residential gateway from the dual-mode phone on a voice channel previously established between the dual-mode phone and the residential gateway, for causing the residential gateway to bridge the call and to anchor the call during the switching of the call between the home identity and the cellular identity
   wherein the call is a VoIP call and establishing the new call further comprises: sending an SIP message and cross connecting the VoIP call and the new call
   wherein initiating the movement of the call further comprises:
       establishing a new call at the residential gateway;
       bridging the call and the new call at the residential gateway; and
       disconnecting the ongoing call.

8. The method of claim 7, wherein the cellular identity is active for the dual-mode phone, further comprising:
   entering a range for the home wireless network with the dual-mode phone; and
   registering the dual-mode phone with the residential gateway as a device on the home wireless network.

9. The method of claim 8, wherein the registering of the dual-mode phone is automatic when the dual-mode phone enters the range of the home wireless network.

10. The method of claim 7, wherein the SIP message sent is a SIP REFER message to a VoIP service provider.

11. The method of claim 7, wherein the SIP message sent is a SIP INVITE message to a party receiving the call.

12. A method for providing call mobility between a cellular network and a home wireless network for a dual-mode phone having a cellular identity and a home identity, wherein the home identity is active when the dual-mode phone is in communication with the home wireless network, the method comprising:
   placing an active call with the dual-mode phone on either one of the home wireless network and the cellular network; and
   sending a signal from the dual-mode phone to the residential gateway while the call is ongoing to initiate the movement of the call between the cellular network and the home wireless network;
   wherein the residential gateway anchors the call; and
   wherein the call is to a first identity of the dual-mode phone, and the placing of the call further comprises:
       verifying at the residential gateway that the call is to the first identity;
       connecting the call to an IVR channel at the residential gateway;
       collecting a DTMF digit string from the dual-mode phone;
       comparing and extracting a second identity of the dual mode phone;
       establishing a new call at the residential gateway based on the DTMF digit string to the second identity;
       bridging the new call to the call; and
       disconnecting the IVR channel.

13. The method of claim 12, wherein the first identity is the home identity of the dual-mode phone, and the second identity is the cellular identity of the dual-mode phone.

14. The method of claim 12, wherein the first identity is the cellular identity of the dual-mode phone, and the second identity is the home identity of the dual-mode phone.

15. A method for providing call mobility between a cellular network and a home wireless network for a dual-mode phone having a cellular identity and a home identity, wherein the home identity is active when the dual-mode phone is in communication with the home wireless network, the method comprising:
   placing an active call with the dual-mode phone on either one of the home wireless network and the cellular network; and
   sending a signal from the dual-mode phone to the residential gateway while the call is ongoing to initiate the movement of the call between the cellular network and the home wireless network;
   wherein the residential gateway anchors the call; and
   wherein the call is to a first identity of the dual-mode phone, and the placing of the call further comprises:
       placing a call to a second identity with the caller-id of the outgoing call set to the first identity;
       wherein:
           the phone detects the caller-id and determines that this call is initiated by the residential gateway for handover;
           the phone answers automatically without indicating to the user and putting the call on-hold; and
           the phone activates the call on-hold when the call on a network associated with the first identity is disconnected.

16. The method of claim 15, wherein the first identity is the cellular identity of the dual-mode phone, the network associated with the first identity is the cellular network, and the second identity is the home identity of the dual-mode phone.

17. The method of claim 15, wherein the first identity is the home identity of the dual-mode phone, the network associated with the first identity is the home wireless network, and the second identity is the cellular identity of the dual-mode phone.

18. A method for providing call mobility between a cellular network and a home wireless network for a dual-mode phone having a cellular identity and a home identity, wherein the home identity is active when the dual-mode phone is in communication with the home wireless network, comprising:
   receiving a call at a dual-mode phone;
   sending a signal from the dual-mode phone to the residential gateway, while the call is ongoing, for initiating the movement of the call between the cellular network and the home wireless network,
   wherein the signal is a DTMF key sequence, transmitted to the residential gateway from the dual-mode phone on a voice channel previously established between the dual-mode phone and the residential gateway, for causing the residential gateway to bridge the call and to anchor the call and the new call;

establishing a new call at the residential gateway, wherein the call is a VoIP call and establishing the new call further comprises: sending an SIP message and cross connecting the VoIP call and the new call;

entering a range for the home wireless network with the dual-mode phone; and registering the dual-mode phone with the residential gateway as a device on the home wireless network, wherein the registering of the dual-mode phone is automatic when the dual-mode phone enters the range of the home wireless network.

19. The method of claim 18, wherein the call is to the home identity when the home identity is not active, the receiving of the call further comprises:

establishing a new call from the residential gateway to the cellular identity; and bridging the call and the new call to the cellular identity.

20. A method for providing call mobility between a cellular network and a home wireless network for a dual-mode phone having a cellular identity and a home identity, wherein the home identity is active when the dual-mode phone is in communication with the home wireless network, comprising:

receiving a call at a dual-mode phone;

sending a signal from the dual-mode phone to the residential gateway, while the call is ongoing, for initiating the movement of the call between the cellular network and the home wireless network, wherein initiating the movement of the call includes (i) bridging the call and the new call at the residential gateway, and (ii) disconnecting the call, wherein the signal is a DTMF key sequence, transmitted to the residential gateway from the dual-mode phone on a voice channel previously established between the dual-mode phone and the residential gateway, for causing the residential gateway to bridge the call and to anchor the call and the new call; and establishing a new call at the residential gateway, wherein the call is a VoIP call and establishing the new call includes sending an SIP message and cross connecting the VoIP call and the new call, wherein the SIP message sent is a SIP INVITE message to a party receiving the call.

21. The method of claim 20, wherein the call is to the home identity when the home identity is not active, the receiving of the call further comprises:

establishing a new call from the residential gateway to the cellular identity; and bridging the call and the new call to the cellular identity.

* * * * *